Figure 1:
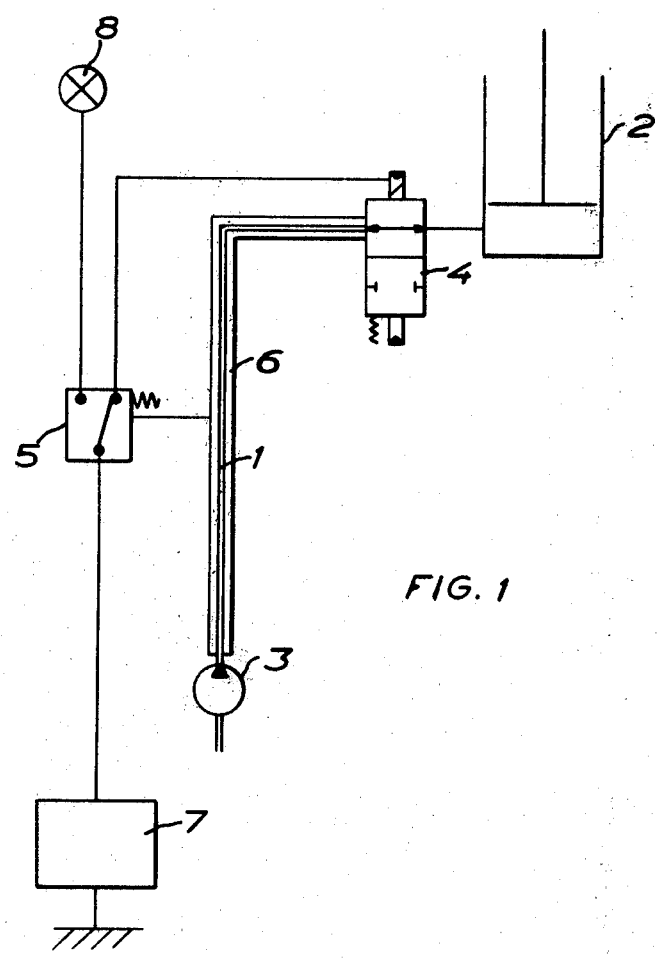

United States Patent [19]

Lindgren

[11] 4,338,812

[45] Jul. 13, 1982

[54] SAFETY APPARATUS FOR AUTOMATIC SUPERVISION AND CONTROL OF A PRESSURE FLUID SYSTEM

[75] Inventor: Kenneth B. Lindgren, Borlänge, Sweden

[73] Assignee: Verkstadsproduktion I Borlänge AB, Borlänge, Sweden

[21] Appl. No.: 217,331

[22] Filed: Dec. 17, 1980

Related U.S. Application Data

[63] Continuation of Ser. No. 967,325, Dec. 7, 1978, abandoned.

[30] Foreign Application Priority Data

Dec. 9, 1977 [SE] Sweden .............................. 7714015

[51] Int. Cl.³ .............................................. G01M 3/02
[52] U.S. Cl. ..................................... 73/40.5 R; 285/93
[58] Field of Search ................. 285/93; 73/40.5 R, 40

[56] References Cited

U.S. PATENT DOCUMENTS

| | | | |
|---|---|---|---|
| 3,280,620 | 10/1966 | Anderson | 73/40.5 R |
| 3,336,584 | 8/1967 | Kaiser | 73/40.5 R |
| 3,472,062 | 10/1969 | Owen | 73/40.5 R |
| 3,874,708 | 4/1975 | Gresens | 285/93 |

FOREIGN PATENT DOCUMENTS 954479  4/1964  United Kingdom .

Primary Examiner—Alan Cohan
Attorney, Agent, or Firm—Beveridge, DeGrandi & Kline

[57] ABSTRACT

In a safety apparatus for automatic leakage supervision at a pressure fluid transition in a contact zone between two interconnected, pressures fluid conducting members there is formed in at least one of the members a passage which opens into the contact zone. The passage contains a pressure medium. Means are provided to maintain a certain predetermined normal pressure in the passage and a monitoring means is adapted to monitor the pressure in the passage to indicate deviations from the normal pressure.

3 Claims, 2 Drawing Figures

SAFETY APPARATUS FOR AUTOMATIC SUPERVISION AND CONTROL OF A PRESSURE FLUID SYSTEM

This is a continuation of application Ser. No. 967,325, filed Dec. 7, 1978 now abandoned.

This invention relates to a safety apparatus for automatic leakage supervision at a pressure fluid transition in a contact zone between two interconnected, pressure fluid conducting members.

In hydraulic systems of high operating pressure there is a great risk of leakage because of line ruptures or erroneous connections of valve mechanisms or hydraulic assemblies. With such a leakage considerable amounts of oil can escape from the system and cause a great deal of damage. Thus there is a need of a safety apparatus which can prevent oil from leaking out of a system when it has been put out of operation for some reason.

With certain hydraulic systems there may occur because of line ruptures accidents of another type, in addition to the oil leakage. As an example there may be cited the boom of an excavator or hoisting crane, the raising and lowering of which is hydraulically operated and which on line rupture and resulting pressure reduction, may drop down with great force, and the machine operator can do nothing to prevent it. Thus, there is also a need of a safety apparatus which is able to prevent accidents of this type.

The object of the present invention therefore is to provide a safety apparatus which is of the type mentioned in the introduction and which makes it possible to prevent damage and accidents of the above mentioned kind.

To this end, there is formed in at least one of the two interconnected, pressure fluid conducting members a passage which opens into the contact zone; this passage contains a pressure medium; means are provided to maintain a certain predetermined normal pressure in the passage; and a monitoring means is adapted to monitor the pressure in the passage to indicate deviations from the normal pressure.

Figure 2:
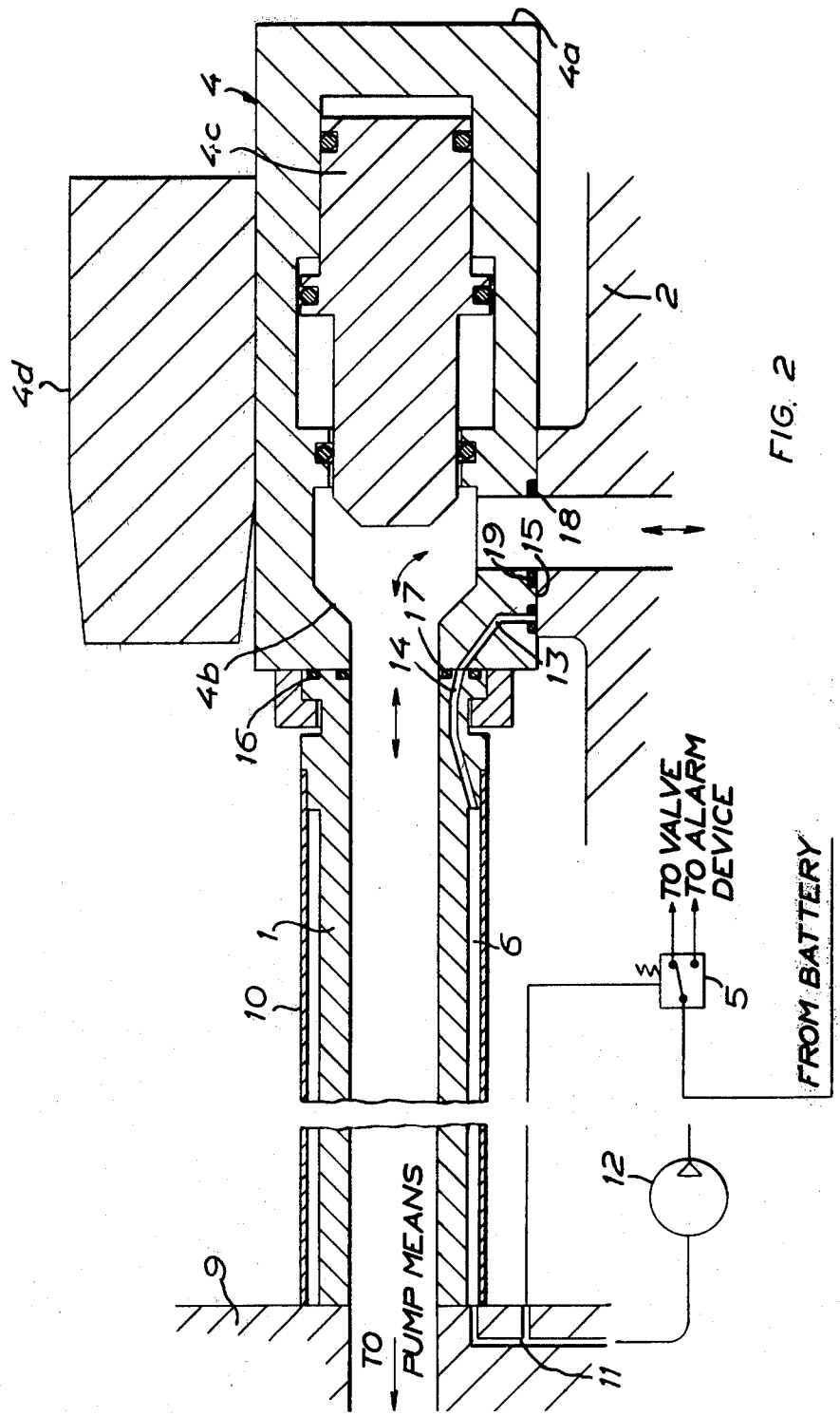

The invention will now be described in greater detail with reference to the accompanying drawings in which FIG. 1 is a diagrammatic view of a hydraulic system having an apparatus for automatic supervision of line ruptures and control of the system;

FIG. 2 shows a safety apparatus according to the invention, which is employed in the hydraulic system according to FIG. 1.

The hydraulic system illustrated in FIG. 1 comprises a line 1 for hydraulic oil, a piston and cylinder assembly 2 connected to the line, and a pump 3. In the present instance, it is assumed that the piston and cylinder assembly 2 controls the raising and lowering of a heavy excavator boom. A pressure increase in the line 1 produces raising of the boom.

An electrically controlled valve 4 having two positions of adjustment is connected to the line 1. In the first position the valve 4 establishes connection between the line 1 and the interior of the piston and cylinder assembly 2, and in its second position the valve breaks this connection. The valve 4 is controlled by an electric signal from a monitoring means 5 which in a manner to be described more in detail below monitors the pressure of a pressure medium in a space 6 surrounding the line 1. A means (not shown in FIG. 1) is adapted to maintain a certain predetermined normal pressure in the space 6. When this normal pressure is maintained in the space 6 the monitoring means 5 transmits such an electric signal from a battery 7 to the valve 4 that said valve will occupy its first position of adjustment, that is maintain the connection between the line 1 and the interior of the piston and cylinder assembly 2. Should the line 1 rupture or the pressure in the space 6 change in another manner this is indicated by the monitoring means 5 in that said means breaks the connection between the battery 7 and the valve 4 which will take its second position of adjustment, that is break the connection between the line 1 and the interior of the piston and cylinder assembly 2. If the pressure in the line 1 and thus in the interior of the piston and cylinder assembly 2 is high and the boom of the excavator thus is in raised position at the moment when the pressure in the space 6, for instance because of a line rupture, rapidly sinks the excavator boom will be retained in raised position since the valve 4 immediately breaks the connection between the line 1 and the interior of the piston and cylinder assembly 2. If, on the other hand, the connection between the line 1 and the interior of the piston and cylinder assembly 2 were not broken in this position the pressure in the interior of the piston and cylinder assembly 2 would sink abruptly, as a result of which the excavator boom would drop.

A valve (not shown) functioning in the same way as the valve 4 and controlled in the same way by the monitoring means 5 can be arranged immediately after the pump 3 to directly close the line 1 when the pressure in the space 6 deviates from the normal pressure. By this arrangement it is possible to prevent unrestrained pumping out of oil upon line rupture. The valve not shown and the valve 4 can also be arranged in such a way that in the absence of an electric signal from the battery 7 they not only close the line 1 but also connect a reserve line (not shown) between the pump 3 and the piston and cylinder assembly 2.

As shown in FIG. 1, a suitable alarm device 8 can further be connected in such a way to the monitoring means 5 that said device receives an electric signal from the battery 7 and delivers an alarm signal when the pressure in the space 6 deviates from the normal pressure.

The different component parts will now be described more in detail with reference to FIG. 2 which shows a safety apparatus serving as a drop protection means for an excavator boom. For the sake of simplicity corresponding component parts in FIGS. 1 and 2 have been given the same reference numerals.

The line 1 contains hydraulic oil and has its one end connected to a directional valve 9 which in turn is in communication with a pump means (not shown in FIG. 2) and its other end connected to a valve 4 which in turn is connected to a piston and cylinder assembly 2 for say an excavator boom.

A sheath 10 is mounted on the line 1 so that said line is surrounded by a space 6. A passage 11 is formed in the housing of the directional valve 9 and one end of said passage 11 is in communication with the space 6 while the other end is connected to a vacuum pump 12 which is adapted to maintain a low normal pressure in the space 6. The passage 11 further is in communication with a vacuum sensing means 5 for sensing the pressure in the space 6.

The valve 4 which may be of any suitable type whatever and as a consequence is only diagrammatically shown as a valve housing 4a having a valve seat 4b, a valve cone 4c and a control unit 4d, functions in the manner described in connection with FIG. 1. A passage 13 is formed in the valve housing 4a and one end of said passage is in communication with a passage 14 extending from the space 6 to the end surface of the line 1 facing the valve 4 and opens at the other end into a surface 15 bearing against the piston and cylinder assembly 2. Suitable sealing means 16, 17, 18 and 19, such as O-rings, are provided around the outlet and inlet of the valve and around the passages 13 and 14 at the contact surfaces between the line 1, the valve 4 and the piston and cylinder assembly 2.

The vacuum sensing means 5 is connected to a battery and, when the pressure in the space 6 is equal to the normal pressure, transmits an electric signal to the control unit 4d which will keep the valve 4 in the open position shown in FIG. 2. If the pressure in the space 6 rises because the sheath 10 and/or the wall of the line 1 ruptures, or the connection of the valve 4 with the line 1 and/or with the piston and cylinder assembly 2, or the connection of the line 1 with the directional valve 9 is untight the vacuum sensing means 5 is reversed whereby the electric signal is disconnected from the control unit 4d and passed to an alarm device. The valve 4 is then immediately closed so that the excavator boom, as earlier mentioned, cannot drop down even if it is in the raised position.

As the valve 4 is open when the control unit receives an electric signal, and closed when the control unit does not receive any electric signal, there is the further safety that a rupture of the electric line between the vacuum sensing means 5 and the control unit 4d results in the valve being closed.

What I claim and desire to secure by Letters Patent is:

1. A safety apparatus for automatic leakage supervision in a system which includes a first and second member, said members each having a planar contact surface and a first fluid conducting passage which intersects this surface to form an opening therein, said members being sealingly interconnected such that their first fluid conducting passages are in communication with one another with said contact surfaces abutting against each other to form therebetween a contact zone which surrounds the openings, said first and second members each also having a second passage which leads to the contact zone and is separate from the respective first passage, said second passages each extending along the entire length of the first passage in the respective member, means being provided for maintaining a predetermined fluid pressure in the second passage, and detector means being provided for detecting whether the pressure in the second passage deviates from the predetermined pressure whereby pressure deviations sensed by the detector will indicate leakage in the contact zone.

2. A safety apparatus according to claim 1 including a third member which has a planar contact surface and a fluid conducting passage which intersects this surface to form an opening therein, said third member being sealingly interconnected with the second member such that their fluid conducting passages are in communication with one another, said contact surfaces of the second and third members abutting each other to form therebetween a second contact zone which surrounds the respective openings, said second passage in said second leading to said second contact zone whereby pressure deviations sensed by the detector will indicate leakage in the second contact zone.

3. A safety apparatus for automatic leakage supervision in a system which includes a first and a second member, said members each having a planar contact surface and a first fluid conducting passage which intersects this surface to form an opening therein, said members being sealingly interconnected such that their first fluid conducting passages are in communication with one another with said contact surfaces abutting against each other to form therebetween a contact zone which surrounds the openings, the sealing interconnection between the contact surfaces being provided by a pair of sealing elements each of which surrounds the openings, said sealing elements being radially spaced from each other and being compressed between the contact surfaces to provide a sealing engagement therewith, said first and second members each also having a second passage which leads to the contact zone and is separate from the respective first passage, said second passages each extending along the entire length of the first passage in the respective member, said second passage entering the contact zone in an area located between the sealing elements, said second passage at its point of entry into the contact zone having a cross sectional area which is substantially smaller than the area between the sealing elements and extending over only a portion of the circumferential extent of the contact zone, means for maintaining a predetermined fluid pressure in the second passage, and detector means being provided for detecting whether the pressure in the second passage deviates from the predetermined pressure whereby pressure deviations sensed by the detector will indicate leakage in the contact zone.

* * * * *